United States Patent
Weber et al.

(10) Patent No.: US 10,384,595 B2
(45) Date of Patent: Aug. 20, 2019

(54) MOTOR VEHICLE HAVING A HIGH MOUNTED BRAKE LIGHT

(71) Applicant: Dr. Ing. h.c. F. Porsche Aktiengesellschaft, Stuttgart (DE)

(72) Inventors: Sebastian Weber, Esslingen (DE); Tobias Posch, Wimsheim (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 176 days.

(21) Appl. No.: 15/611,805

(22) Filed: Jun. 2, 2017

(65) Prior Publication Data

US 2017/0349091 A1    Dec. 7, 2017

(30) Foreign Application Priority Data

Jun. 7, 2016   (DE) .................. 10 2016 110 492

(51) Int. Cl.

| | |
|---|---|
| *B60Q 1/26* | (2006.01) |
| *H02J 50/10* | (2016.01) |
| *B60Q 1/00* | (2006.01) |
| *B60Q 1/44* | (2006.01) |
| *H02J 7/00* | (2006.01) |
| *H02J 7/02* | (2016.01) |
| *B62D 35/00* | (2006.01) |

(52) U.S. Cl.
CPC ......... *B60Q 1/2661* (2013.01); *B60Q 1/0035* (2013.01); *B60Q 1/0088* (2013.01); *B60Q 1/44* (2013.01); *H02J 7/0042* (2013.01); *H02J 7/0068* (2013.01); *H02J 7/025* (2013.01); *H02J 50/10* (2016.02); *B62D 35/007* (2013.01)

(58) Field of Classification Search
CPC .. B60Q 1/2661; B60Q 1/0035; B60Q 1/0088; B60Q 1/44; H02J 50/10; H02J 7/0042; H02J 7/0068; H02J 7/025; B62D 35/007
See application file for complete search history.

(56) References Cited

U.S. PATENT DOCUMENTS

| | | | |
|---|---|---|---|
| 5,923,245 A | 7/1999 | Klatt et al. | |
| 6,170,904 B1* | 1/2001 | Schaedlich | B62D 35/007 296/180.1 |
| 7,220,032 B2* | 5/2007 | Mori | B60Q 1/2615 296/180.1 |
| 2010/0202136 A1* | 8/2010 | Vittozzi | B60Q 1/2615 362/183 |
| 2013/0020937 A1* | 1/2013 | Tatara | B60Q 1/0094 315/77 |

FOREIGN PATENT DOCUMENTS

| | | |
|---|---|---|
| DE | 19652692 C1 | 6/1998 |
| DE | 10035686 A1 | 3/2001 |
| EP | 0047793 A1 | 3/1982 |

* cited by examiner

*Primary Examiner* — Carlos Amaya
(74) *Attorney, Agent, or Firm* — Leydig, Voit & Mayer, Ltd.

(57) ABSTRACT

A motor vehicle includes a high-mounted brake light which is arranged on a rear part of the motor vehicle, and an energy source for making available energy for the motor vehicle. A charging plate is connected to the energy source, and the charging plate is arranged in a rear portion of the motor vehicle. The rear part is a wing of a spoiler, and a receiver coil is arranged in the rear part. The receiver coil can be coupled in a wireless fashion to the charging plate for contactless transfer of energy between the brake light and the energy source.

6 Claims, 4 Drawing Sheets

_US 10,384,595 B2_

MOTOR VEHICLE HAVING A HIGH MOUNTED BRAKE LIGHT

CROSS REFERENCE TO RELATED APPLICATIONS

This application claims benefit to German Patent Application No. DE 10 2016 110 492.2, filed Jun. 7, 2016, which is hereby incorporated by reference herein.

FIELD

The invention relates to a motor vehicle having a high-mounted brake light on a rear part of a motor vehicle, in particular a passenger motor vehicle, wherein the brake light is connected to an energy source of the motor vehicle.

BACKGROUND

High-mounted brake lights, are, in particular, an additional light which is positioned at a higher level than the two brake lights of the motor vehicle arranged in side regions of the motor vehicle.

For example, the brake light can be arranged in a rear trim of the motor vehicle which has an elevated portion in the form of a rump. In this context, the brake light can be arranged in the rump. The brake light can as a result be arranged underneath a rear window of a motor vehicle. In order to supply energy, the brake light is connected to an energy source, for example the vehicle battery, by means of cables in the rump. Such an arrangement requires installation space and additional working steps for the cabling.

SUMMARY

In an embodiment, the present invention provides a motor vehicle comprising a high-mounted brake light which is arranged on a rear part of the motor vehicle, and an energy source for making available energy for the motor vehicle. A charging plate is connected to the energy source, and the charging plate is arranged in a rear portion of the motor vehicle. The rear part is a wing of a spoiler, and a receiver coil is arranged in the rear part. The receiver coil can be coupled in a wireless fashion to the charging plate for contactless transfer of energy between the brake light and the energy source.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
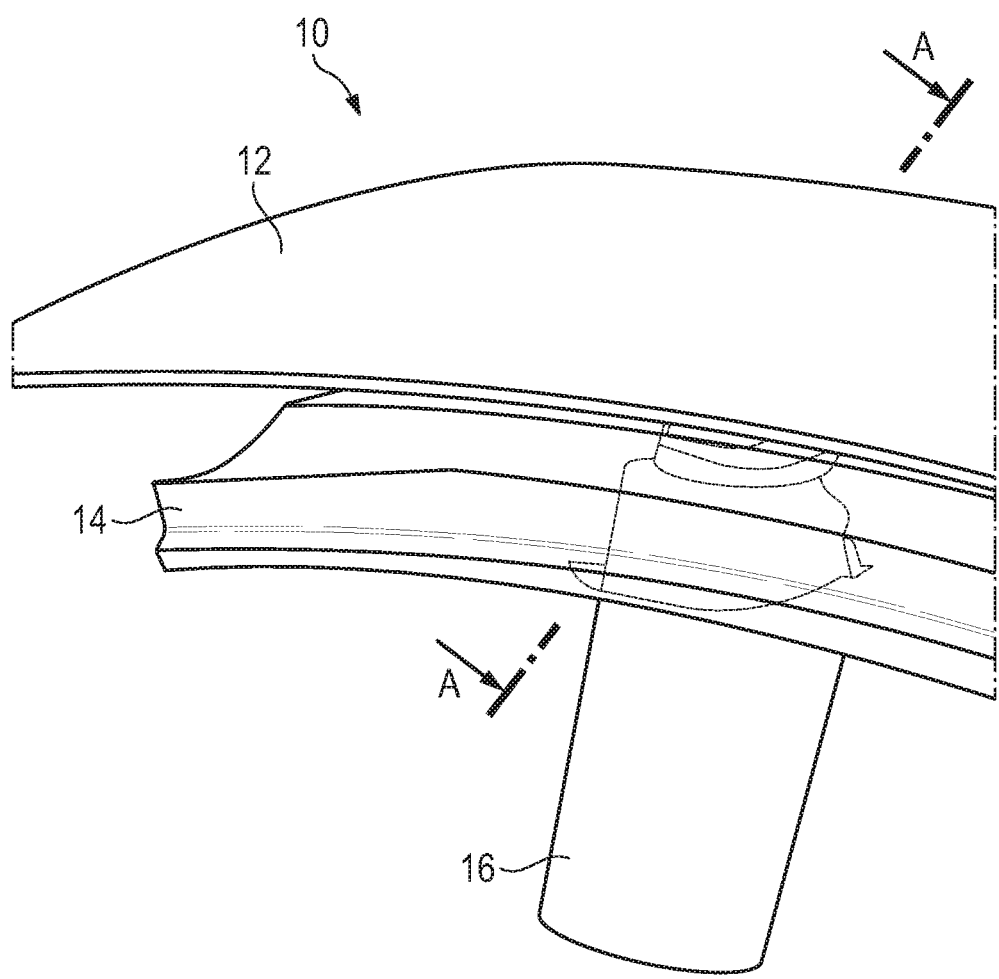
FIG. 1 shows a perspective rear view of a detail of a sectional view of the rear of a motor vehicle with a first embodiment of a rear part which is arranged on a body.

A motor vehicle in which a high-mounted brake light can be more easily connected to the energy source of the motor vehicle is described herein.

According to an embodiment of the invention, a motor vehicle is provided having a high-mounted brake light which is arranged on a rear part, and an energy source for making available energy for the motor vehicle, wherein a charging plate is connected to the energy source, and the charging plate is arranged in a rear portion of the motor vehicle, wherein the rear part is a wing of a spoiler, and a receiver coil is arranged in the rear part, wherein the receiver coil can be coupled in a wireless fashion to the charging plate for contactless transfer of energy between the brake light and the energy source.

The term rear part describes here a built-on part which is built onto the body of a motor vehicle. It is preferred that the rear part be an air-guiding device. In particular, the rear part can be a spoiler. The spoiler can in this context disrupt the air flow around the motor vehicle and as a result influence the aerodynamics of the motor vehicle. The brake light can in this context be integrated, in particular, into a wing of a spoiler. The term wing describes here a part of a spoiler over which there can be a flow both on the upper side and on the lower side thereof. In this context, the wing can generate downthrust, in particular a pressing point for better ground adhesion of the motor vehicle, and at the same time operate in a largely aerodynamically independent fashion or bring about additional effects in interaction with the body aerodynamics of the motor vehicle. The spoiler can in this context also be a roof spoiler which can be arranged in the junction between the roof and the tailgate. In particular, the air-guiding device can be embodied in such a way that the uplift of the motor vehicle can be reduced and the air resistance of the motor vehicle can be increased as little as possible or reduced.

The term energy source describes here a vehicle battery and/or a dynamo of a motor vehicle.

The receiver coil and the charging plate are not connected to one another by means of a wire. Instead, an energy supply can be transmitted in a wireless fashion. In the case of the wireless transmission of energy, also referred to as contactless transmission of energy, cableless transmission of power or contactless transmission of power, electrical energy can be transmitted in a contactless fashion from one object to another, in order to operate or supply that object with electrical energy. One central property is that the electrical energy which is necessary for operation is not fed along electric leads and by means of electrical contacts but instead by means of non-wire-bound electromagnetic fields. In particular, wireless transmission can be carried out by means of close-range transmission such as inductive coupling, resonant inductive coupling or by means of capacitive coupling, or by means of long-range transmission. In particular, the charging plate can be arranged in the direct vicinity of the receiver coil, in order to permit essentially interference-free coupling for supplying energy to the brake light. In this context, the receiver coil can be arranged spaced apart from the charging plate. The receiver coil can also make contact with the charging plate.

In a motor vehicle according to the invention, the rear trim can be modified on the basis of design and in order to reduce the coefficient of flow resistance, in such a way that the rump is below the limits prescribed by applicable laws. By relocating the brake light from the rear trim into a rear part, wherein the rear part is above or at the legally prescribed height for a high-mounted brake light, and by means of wireless coupling of the brake light to the energy source, the mounting difficulties which occur owing to the limited installation space in the rear part, in particular in the wing of a spoiler, can be overcome. Furthermore, working steps during the assembly of the rear part and during the laying of cables can be eliminated by wireless transmission of energy to the brake light.

Therefore, a motor vehicle is made available in which a high-mounted brake light can easily be connected to the energy source of the motor vehicle.

A controller for controlling the connection of the brake light to the energy source is preferably arranged in the rear part. In particular, by using the controller the brake light can be activated and then light up if the brake pedal is activated or a braking process is initiated. The control device can be connected here in a wireless fashion, for example by means of Bluetooth or WLAN or in a cable-bound fashion, for example by means of CAN, LIN, MOST, FlexRay or Ethernet, to a main controller, for example a central ECU, an abbreviation for "electronic control unit" of the motor vehicle. Furthermore, the controller can also be connected to the brake pedal, with the result that when the brake pedal is activated the controller can activate the high-mounted brake light.

In one preferred embodiment, an energy supply system is arranged in the rear part in order to supply energy to the brake light. The energy supply system can be, for example, a battery or an accumulator pack, in particular an Li ion battery. By means of an energy supply system which is arranged in the rear part, the brake light in the motor vehicle can be activated even when the engine is switched off, for example when the ignition system is switched off or when there is a stop at a traffic light, and when the charging plate of the motor vehicle is switched off. As a result, the energy demand for the motor vehicle can be lowered since the charging plate does not have to be supplied continuously with energy in order to supply the brake light with energy via the receiver coil. In particular, given corresponding activation of the brake the brake light can light up without being connected to the energy source of the motor vehicle. In this context, the energy supply system can be arranged in a replaceable fashion in the rear part and be replaced when necessary, for example when the energy supply system is empty.

It is preferred that the energy supply system can be connected to the energy source by means of the receiver coil in order to charge the energy supply system. In this way, the energy supply system can easily be charged without the energy supply system having to be disassembled and/or replaced. In particular, the energy supply system can be charged while the motor vehicle is moving, for example when the motor vehicle is traveling.

The brake light can preferably be coupled to the energy supply system or to the receiver coil by means of the controller as a function of the state of charge of the energy supply system. In this context, the controller can monitor the state of charge of the energy supply system. The controller can preferably connect the brake light to the energy supply system in order to supply energy during the activation, and connect the brake light directly to the energy source of the motor vehicle only when necessary, when, for example, the energy supply system is empty. In this way, the energy source can be used for other loads in the motor vehicle and can be connected directly to the brake light only when necessary. Furthermore, a signal can be transmitted to the main controller by the controller in order to charge the charging plate with energy, with the result that the charging plate is supplied with energy only then in order to supply the brake light directly with energy via a wireless connection of the receiver coil to the charging plate or in order to charge the energy supply system in the rear part via a wireless connection of the receiver coil to the charging plate.

In one preferred embodiment, the rear part can be extended by means of at least one deployment device. As a result, the aerodynamics of the motor vehicle can be adapted in accordance with the speed of the motor vehicle.

It is preferred that the charging plate for wireless coupling to the receiver coil is arranged in the body of the motor vehicle in order to connect the brake light and/or the energy supply system to the energy source. By means of an arrangement of a charging plate in the body, the entire body can be used as an installation space for the charging plate. In particular, the charging plate can be arranged in the direct vicinity of the receiver coil. In this context, the charging plate can be arranged under the body trim in such a way that it cannot be seen from the outside.

A charging plate is preferably arranged in the at least one deployment device for the purpose of wireless coupling to the receiver coil in order to connect the brake light and/or the energy supply system to the energy source. By means of an arrangement of the charging plate in the deployment device it can be ensured that the distance between the receiver coil and the charging plate remains the same. Furthermore, the hollow space which is present in the deployment device can be used as an installation space for the charging plate, with the result that no extra installation space has to be made available for the charging plate.

FIG. 1 illustrates a perspective rear view of a detail of a rear of a motor vehicle 10. The illustrated rear portion of the motor vehicle 10 comprises a rear part 12 and a body trim 14. Furthermore, it is apparent that the rear part 12 is an air-guiding device in the form of a wing of a spoiler. The rear part 12 can be extended by means of a deployment device 16.

Figure 2:
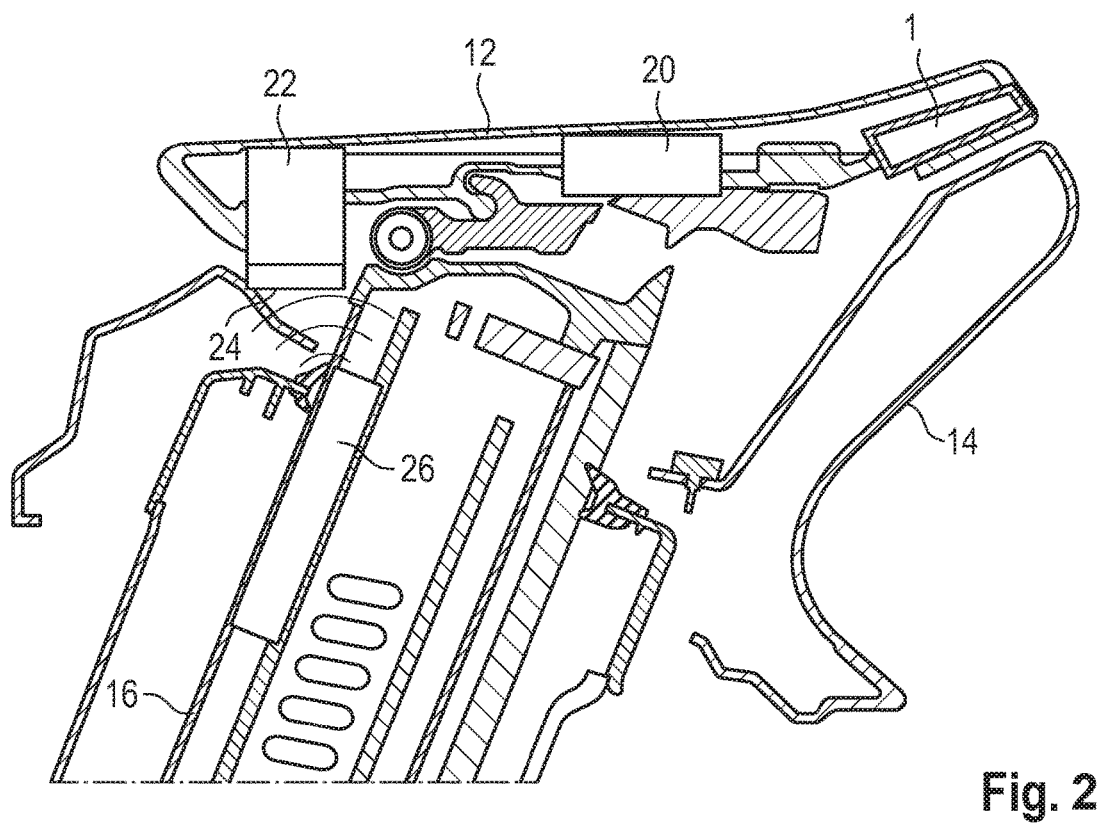
FIG. 2 shows a view of the section A-A in FIG. 1.

FIG. 2 shows the section A-A in FIG. 1. A brake light 18 which is connected to a controller 20, is arranged in the rear part 12. The brake light 18 is a high-mounted brake light. The controller 20 is connected to an energy supply system 22. The energy supply system 22 is, in this exemplary embodiment, a battery, for example an Li ion battery. The energy supply system 22 is connected in a wireless fashion on its side pointing to the deployment device 16 to a receiver coil 24. The controller 20 monitors the state of charge of the energy supply system 22. Depending on the state of charge of the energy supply system 22, the controller 20 connects the brake light 18 to the energy supply system 22, for example when the energy supply system is fully charged, or directly to the receiver coil 24, when, for example, the energy supply system 22 is empty. Furthermore, the controller 20 receives control signals of a main controller of the motor vehicle, in order to cause the brake light 18 to light up. The controller 20 can receive the control signals in a wireless fashion here, for example by means of Bluetooth or WLAN.

The rear part 12 can be extended from the body part 14 using the deployment device 16. Furthermore, a charging plate 26 is arranged in the deployment device 16. The charging plate 26 is connected to an energy source of the motor vehicle 10. The energy source can be the car battery. The charging plate 26 connects in a wireless fashion, in particular inductively, to the receiver coil 24 in order to supply the brake light 18 with energy and/or to charge the energy supply system 22. The wireless transmission of energy is illustrated in FIG. 2 with circular segments between the receiver coil 24 and the charging plate 26.

Figure 3:
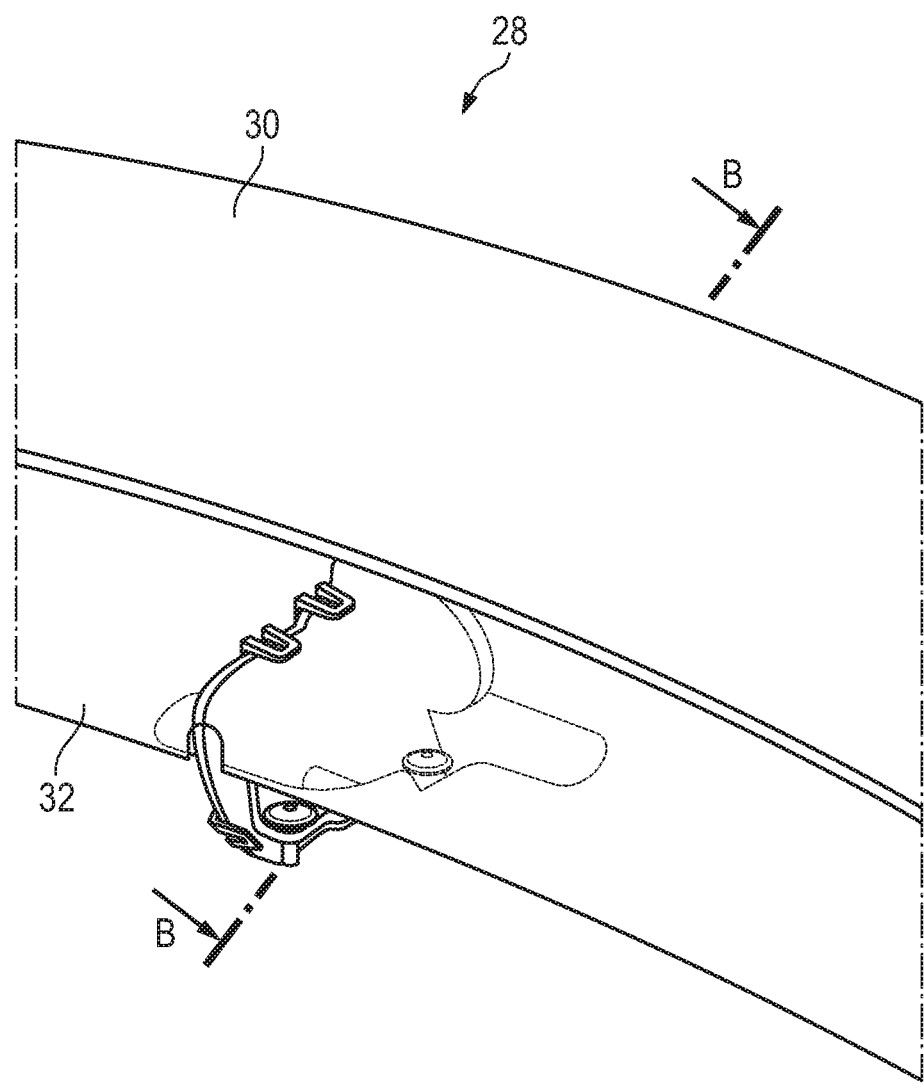
FIG. 3 shows a perspective rear view of a detail of a sectional view of the rear of a motor vehicle with a second embodiment of a rear part which is arranged on a body.

FIG. 3 illustrates a perspective rear view of a detail of a rear of a motor vehicle 28. The illustrated rear portion of the motor vehicle 28 comprises a rear part 30 and a body trim 32.

Figure 4:
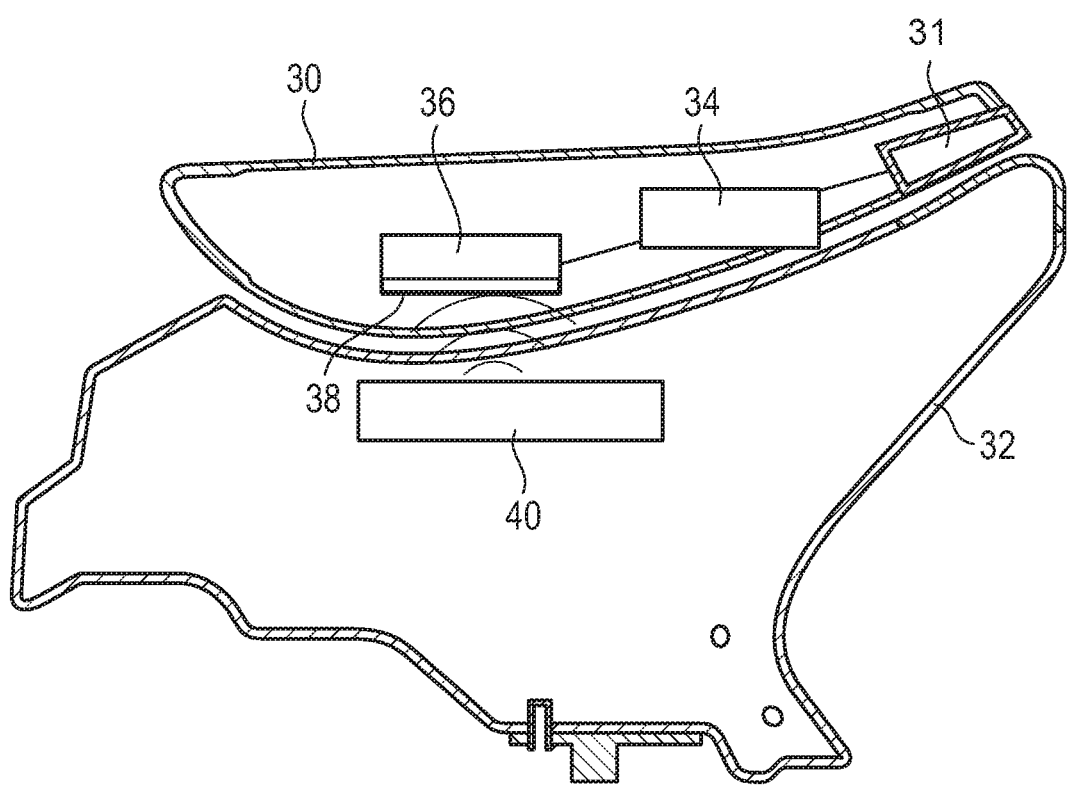
FIG. 4 shows a view of the section B-B in FIG. 3.

FIG. 4 shows the section B-B in FIG. 3. A brake light 31 which is connected to a controller 34 is arranged in the rear part 30. The brake light 31 is a high-mounted brake light. The controller 34 is connected to an energy supply system 36. The energy supply system 36 is, in this exemplary embodiment, a battery, for example an Li ion battery. The energy supply system 36 is connected on its side pointing to the body trim 32 to a receiver coil 38. The controller 34 monitors the state of charge of the energy supply system 36. Depending on the state of charge of the energy supply system 36, the controller 34 connects the brake light 31 to the energy supply system 36, for example when the energy supply system 36 is fully charged, or directly to the receiver coil 38, when, for example, the energy supply system 36 is empty. Furthermore, the controller 34 receives control signals of a main controller of the motor vehicle, in order to cause the brake light 31 to light up. The controller 34 can receive the control signals in a wireless fashion here, for example by means of Bluetooth or WLAN.

A charging plate 40 is arranged in the body trim 32. The charging plate 40 is connected to an energy source of the motor vehicle 28. The energy source can be the car battery. The charging plate 40 connects in a wireless fashion, in particular inductively, to the receiver coil 38 in order to supply the brake light 31 with energy and/or to charge the energy supply system 36. The wireless transmission of energy is illustrated in FIG. 4 with circular segments between the receiver coil 38 and the charging plate 40.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A motor vehicle comprising:
    a high-mounted brake light which is arranged on a rear part of the motor vehicle, and
    an energy source for making available energy for the motor vehicle,
    wherein a charging plate is connected to the energy source, and the charging plate is arranged in a rear portion of the motor vehicle,
    wherein the rear part is a wing of a spoiler, and
    a receiver coil is arranged in the rear part,
    wherein the receiver coil can be coupled in a wireless fashion to the charging plate for contactless transfer of energy between the brake light and the energy source,
    wherein the rear part can be extended by means of at least one deployment device, and
    wherein the charging plate is arranged in the at least one deployment device for the purpose of wireless coupling to the receiver coil in order to connect the brake light and/or the energy supply system to the energy source.

2. The motor vehicle as claimed in claim 1, wherein a controller for controlling the connection of the brake light to the energy source is arranged in the rear part.

3. The motor vehicle as claimed in claim 1, wherein an energy supply system is arranged in the rear part in order to supply energy to the brake light.

4. The motor vehicle as claimed in claim 3, wherein the energy supply system can be connected to the energy source by means of the receiver coil in order to charge the energy supply system.

5. The motor vehicle as claimed in claim 2, wherein the brake light can be coupled to the energy supply system or to the receiver coil by means of the controller as a function of the state of charge of the energy supply system.

6. The motor vehicle as claimed in claim 1, wherein the charging plate for wireless coupling to the receiver coil is arranged under a body of the rear portion of the motor vehicle in order to connect the brake light and/or the energy supply system to the energy source.

* * * * *